US009581500B2

(12) United States Patent
Durand et al.

(10) Patent No.: US 9,581,500 B2
(45) Date of Patent: Feb. 28, 2017

(54) DIAGNOSIS OF THE DEFECTIVE STATE OF A BOLOMETRIC DETECTION ARRAY

(71) Applicant: ULIS, Veurey Voroize (FR)

(72) Inventors: Alain Durand, Voiron (FR); Aurélie Touvignon, La Frette (FR)

(73) Assignee: ULIS (FR)

( * ) Notice: Subject to any disclaimer, the term of this patent is extended or adjusted under 35 U.S.C. 154(b) by 449 days.

(21) Appl. No.: 14/340,117

(22) Filed: Jul. 24, 2014

(65) Prior Publication Data

US 2015/0039271 A1  Feb. 5, 2015

(30) Foreign Application Priority Data

Jul. 30, 2013 (FR) ...................................... 13 57516

(51) Int. Cl.
| | |
|---|---|
| *G06F 11/30* | (2006.01) |
| *G01J 5/20* | (2006.01) |
| *G01J 5/22* | (2006.01) |
| *G01J 5/00* | (2006.01) |

(52) U.S. Cl.
CPC . *G01J 5/20* (2013.01); *G01J 5/22* (2013.01); *G01J 2005/0048* (2013.01)

(58) Field of Classification Search
CPC ........ G01J 5/22; G01J 2005/0048; G01J 5/20; H04N 5/361; H04N 5/3651; H04N 5/33; H04N 5/3575; H01L 27/14649; H01L 27/14669
USPC .......................................... 702/127, 182–185
See application file for complete search history.

(56) References Cited

U.S. PATENT DOCUMENTS

| 5,047,861 | A | 9/1991 | Houchin et al. | |
|---|---|---|---|---|
| 7,679,048 | B1 * | 3/2010 | Aziz ......................... | G01J 5/02 250/252.1 |
| 7,737,400 | B2 * | 6/2010 | Funaki ...................... | G01J 5/20 250/332 |
| 8,158,942 | B2 * | 4/2012 | Dupont ..................... | G01J 5/20 250/338.1 |
| 8,987,668 | B2 * | 3/2015 | Vilain ....................... | G01J 5/22 250/332 |

(Continued)

FOREIGN PATENT DOCUMENTS

WO            0171299 A2      9/2001

*Primary Examiner* — An Do
(74) *Attorney, Agent, or Firm* — St Onge Steward Johnson and Reens LLC

(57) ABSTRACT

Method of diagnosing the state of signal-forming chains of a detector including an array of detection bolometers, each chain comprising a bolometer, a circuit of stimulation, and a circuit forming a signal according to said stimulation, including forming an image of a substantially uniform scene on the array; applying at least first and second stimulations to the chains; reading the formed signals; and for each chain in a predetermined set, defining a neighborhood of chains; calculating coefficients of a polynomial interpolating the values of signals formed by said chain; calculating, for each chain of the neighborhood, coefficients of a polynomial interpolating the values of signals formed by said neighborhood chain; calculating an average and standard deviation of said coefficients of the neighborhood chains or of the set of neighborhood chains and said chain; and diagnosing if said chain is defective using the coefficients and the calculated average and standard deviation.

7 Claims, 4 Drawing Sheets

(56) References Cited

U.S. PATENT DOCUMENTS

2003/0160171 A1    8/2003   Parrish et al.
2005/0029453 A1    2/2005   Allen et al.
2005/0157942 A1    7/2005   Chen et al.

* cited by examiner (State of the art)

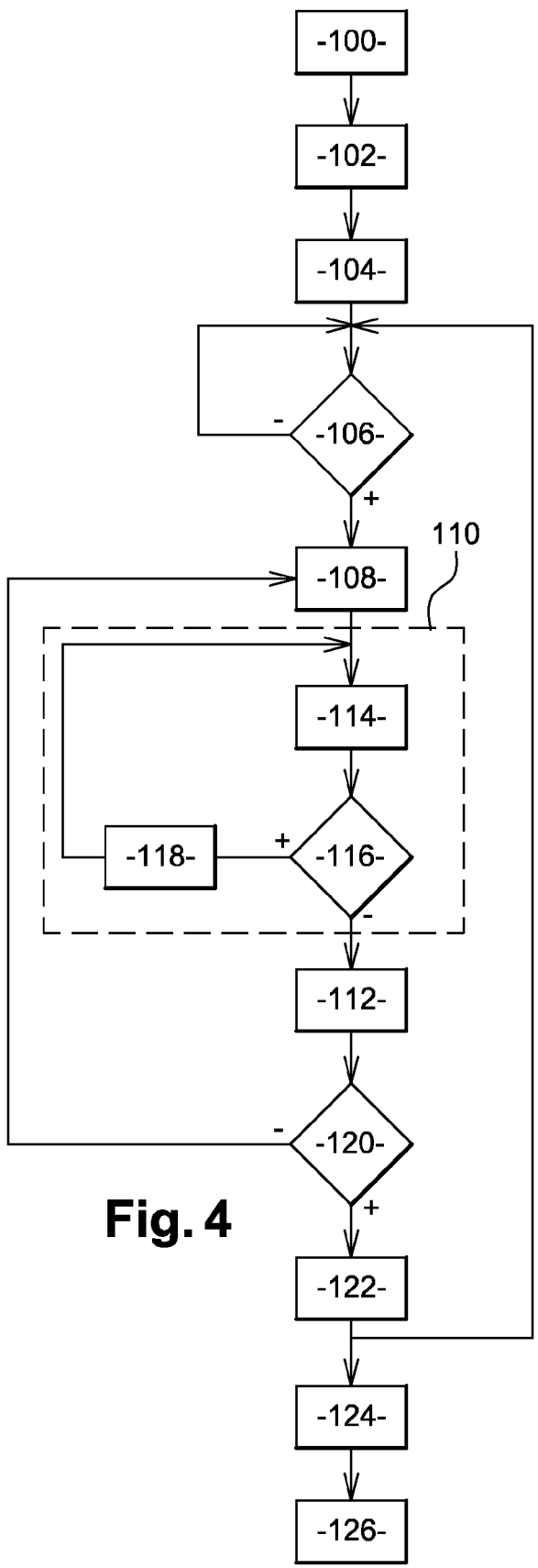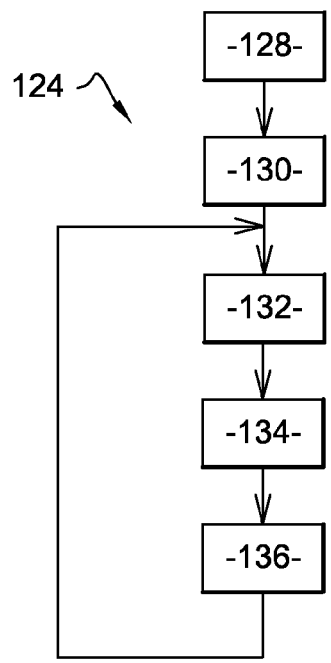
Fig. 4
Fig. 5

US 9,581,500 B2

DIAGNOSIS OF THE DEFECTIVE STATE OF A BOLOMETRIC DETECTION ARRAY

FIELD OF THE INVENTION

The present disclosure relates to infrared bolometric imaging and pyrometry. More specifically, the invention relates to bolometric infrared detectors comprising an array of bolometers formed of membranes suspended above a substrate.

BACKGROUND OF THE INVENTION

In the field of so-called "thermal" infrared detectors, it is known to use one-dimensional or two-dimensional arrays of elements sensitive to infrared radiation, capable of operating at ambient temperature.

A thermal infrared detector conventionally uses the variation of a physical quantity of a so-called "thermometric" or "bolometric" material, according to its temperature. Most currently, this physical quantity is the electric resistivity of said material, which is highly temperature-dependent. The unit sensitive elements of the detector, or "bolometers", are usually in the form of membranes, each comprising a layer of thermometric material, and suspended above a substrate, generally made of silicon, via support arms having a high thermal resistance, the array of suspended membranes being usually called "retina".

Such membranes especially implement a function of incident radiation absorption, a function of conversion of the power of the absorbed radiation into thermal power, and a thermometric function of conversion of the generated thermal power into a variation of the resistivity of the thermometric material, such functions being implementable by one or a plurality of distinct elements.

Further, the support arms of the membranes are also conductive and connected to the thermometric layer thereof, and means for sequentially addressing and biasing the thermometric elements of the membranes and means for forming electric signals usable in video formats are usually formed in the substrate having the membranes suspended thereabove. The substrate and the integrated means are commonly called "read circuit".

The read circuit and the sensitive retina of a detector are usually integrated in a sealed package under very low pressure, provided with a window transparent to the radiation of interest, usually having a wavelength in the range from 8 to 14 micrometers. This range corresponds to the transparency window of the atmosphere and to the majority of the radiations originating from scenes in the vicinity of 300 K.

To obtain a thermal or pyrometric image via such a detector, the scene is focused through an adapted optical system onto the focal plane having the retina arranged thereon, and clocked electrical stimuli are applied via the read circuit to each of the bolometers, or to each row of such bolometers, to obtain a "video" electric signal forming the image or the measurement of the temperature reached by each of said elementary detectors. The signal may be more or less elaborately shaped, directly by the read circuit, and then transmitted in analog or digital form to an electronic system external to the package. This electronic system typically applies various corrections to each video frame delivered by the detector, in particular a correction of spatial offset and gain dispersions (called "NUC" for "Non Uniformity Corrections"), to generate a thermal or pyrometric image capable of being displayed, or more generally for the use of the signals thus formed from the observed scene.

The average temperature of the sensitive membranes is essentially imposed by the substrate temperature which, in the absence of stabilization, varies due, in particular, to changes in environmental conditions, which are essentially reflected by thermal conduction through the integrated system elements. Such temperature variations induce a drift in the average signal at the output of the bolometers. Bolometric detectors may be equipped with a module for stabilizing the substrate temperature, usually a Peltier-effect module (TEC, for "Thermo Electric Cooler") to avoid such signal drifts. Such stabilizing means however make the component more complex and expensive and imply an electric power consumption which is all the higher as the ambient temperature is distant from the selected stabilization temperature.

As a variation, the detector comprises no temperature stabilization module, and an element for compensating the focal plane temperature (TPF) is provided in the electronic signal forming circuit in relation with the temperature of the bolometers, said compensation element being itself bolometric, that is, having its electric behavior following the substrate temperature, but remaining essentially insensitive to radiation. This result is for example obtained by means of bolometric structures provided, by construction, with a lower thermal resistance towards the substrate, and/or by masking these structures behind a screen opaque to the thermal radiation to be detected. The use of such compensation elements further has the advantage of eliminating most of the so-called common-mode current originating from imaging or "active" bolometers.

FIG. 1 is an electric diagram of a bolometric detector 10 with no temperature regulation, or "TECless" detector of the state of the art, comprising a common-mode compensation structure, and FIG. 2 is an electric diagram of a circuit used to form a read signal of a bolometer of the compensated common-mode detector. Such a detector is for example described in document: "*Uncooled amorphous silicon technology enhancement for 25 μm pixel pitch achievement*"; E. Mottin et al, Infrared Technology and Application XXVIII, SPIE, vol. 4820E.

Detector 10 comprises a two-dimensional array 12 of unit bolometric detection elements 14, or "pixels", each comprising a sensitive resistive bolometer 16 in the form of a membrane suspended above a substrate, such as previously described, and having an electric resistance $R_{ac}$. Each bolometer 16, also called "active" or "detection" bolometer, is connected at one of its terminals to a constant voltage VDET, especially the ground of detector 10, and at its other terminal to a MOSFET biasing transistor 18 operating in saturated state, for example, an NMOS transistor, setting voltage $V_{ac}$ across bolometer 16 by means of a gate control voltage GAC. Pixel 14 also comprises a selection switch 20, connected between MOS transistor 18 and a node A provided for each column of array 12, and driven by a control signal SELECT, enabling to select bolometer 16 for the reading thereof. Transistor 18 and switch 20 are usually formed in the substrate under the influence of the membrane of bolometer 16. Elements 16 and 18 form a so-called "detection" branch.

Detector 10 also comprises, at the foot of each column of array 12, a compensation structure 22, also usually called "skimming" structure. Structure 22 comprises a compensation bolometer 24, of electric resistance $R_{cm}$, made insensitive to the incident radiation originating from the scene to be observed.

Bolometer 24 is built by means of the same thermometric material as bolometer 16, but according to a structural configuration provided with a very low thermal resistance towards the substrate. This result can be easily achieved, for example, by means of a direct construction of the resistive elements of the bolometer in contact with the substrate, or by the simple absence of arms of a resistive bolometric structure, which is however suspended, or also by preserving a thermally-conductive material between the substrate and the bulk of the compensation bolometer. The electric resistance of bolometer 24 is thus essentially dictated by the substrate temperature, bolometer 24 then being said to be "thermalized" to the substrate.

Bolometer 24 is connected at one of its terminals to a constant voltage VSK, and compensation structure 22 further comprises a MOSFET bias transistor 26 operating in saturated state, having a biasing opposite to that of transistors 18 of detection pixels 14, for example, a PMOS transistor, setting voltage $V_{cm}$ across bolometer 24 by means of a gate control voltage GCM and connected between the other terminal of compensation bolometer 24 and node A. Elements 24 and 26 form a so-called compensation terminal common to each column. While it is not necessary to adjust resistance $R_{cm}$ of bolometer 24, by design, to a value close to that of bolometer 16, it is however necessary to adjust the current flowing therethrough to a value close to that which runs through the detection branch during the reading. This result is for example and typically obtained by means of a resistance lower than that of bolometer 16, and of a bias voltage $V_{cm}$ smaller roughly by the same proportion.

Detector 10 also comprises, at the foot of each column of array 12, an integrator 28 of CTIA type ("Capacitive TransImpedance Amplifier"), for example comprising an operational amplifier 30 and a capacitor 32 connected between the inverting input and the output of amplifier 30. Its inverting terminal and its non-inverting terminal are further respectively connected to node A and to a constant voltage VBUS. Voltage VBUS thus forms a reference for the output signals, and is between VDET and VSK. A switch 34, driven by a signal Reset, is also provided in parallel with capacitor 32, for the discharge thereof. The outputs of CTIAs 28 are eventually, for example, connected to respective sample-and-hold circuits 36 for the delivery of voltages Vout of CTIAs in multiplexed mode by means of a multiplexer 38 to one or a plurality of series output amplifier(s) 40. It may also be integrated at the output of the digitizing means (analog-to-digital conversion: ADC). Finally, detector 10 comprises a synchronization and video processing unit 42 particularly controlling the different previously-described switches. In operation, array 12 is read from row by row, the whole of read rows thus forming an image frame, or "frame". To read from a row of array 12, switches 20 of the line of pixels 14 are turned on and switches 20 of the other lines are turned off.

After a phase of discharge of the CTIA capacitors at the foot of the columns, achieved by the turning-on of switches 34 followed by their turning-off, a circuit such as shown in FIG. 2 is thus obtained for each pixel of the row being read from. A current $I_{ac}$ flows through detection bolometer 16 of the pixel under the effect of its voltage biasing by MOSFET transistor 18, and a current $I_{cm}$ flows through compensation bolometer 24 of the compensation structure under the effect of its voltage biasing by MOSFET transistor 26. These currents are subtracted from each other at node A, and the resulting current difference is integrated by CTIA 28 during a predetermined integration period $T_{int}$. Output voltage Vout of CTIA 28 thus is a measurement of the variation of the resistance of detection bolometer 16 caused by the incident radiation to be detected since the non-useful part of current $I_{ac}$ is at least partly compensated for by current $I_{cm}$ specifically generated to reproduce this non-useful part.

Further, as previously described, since detection bolometers 16 are not strictly identical, voltages Vout exhibit a dispersion of their values in front of a uniform scene, or "offset dispersion". Similarly, a dispersion of the detector responsiveness, or "gains dispersions", that is, a dispersion of the variations of voltages Vout in front of a uniform variation of a uniform scene, can be observed. Such dispersions adversely affecting the quality of the images generated by the detector, voltages Vout are usually corrected by unit 42 by at least the offset dispersion. The correction of the offset dispersion only is usually designated as a "1-point" correction, while the correction combining both the offset dispersion and the gain dispersion is currently called "2-point" correction.

In the following, expression "raw signal" designates a non-corrected signal, and particularly designates signals upstream of unit 42. In particular, this expression indifferently designates analog signals, for example, voltages Vout at the output of the CTIAs, or digital signals, for example, digital values of voltages Vout if the "1-point" or "2-point" correction is implemented digitally, the analog or digital form of the raw signals being easily understood from the context in which the expression is used. Expression "raw image" or "raw frame" thus designates all the raw signals originating from a reading from array 12.

Similarly, expression "corrected signal" designates a signal having undergone a correction aiming at eliminating or compensating for the signal dispersion, for example, a "1-point" or "2-point" correction, and expression "corrected image" or "corrected frame" thus designates an image or frame corrected from the raw values by the "1-point" or "2-point" correction.

A defective pixel is a unit detection element having its corresponding signal, for example, voltage Vout in the above-described detector example, considered as non usable to form an image element representative of the observed scene. For example, a defective pixel produces a signal which is saturated on one side or the other of the output dynamic range of the signal-forming chain and this, whatever the observed scene.

More generally, a defective pixel is a pixel which may generate, after the application of a "1-point" or "2-point" correction, a signal having an abnormal deviating to its neighbors, which cannot be imputed to the observed scene and is visible on an image or on a video sequence in given environmental conditions. This deviating may originate from various physical causes which induce a marked deviation of the intrinsic electric and/or optical behavior of the defective pixel with respect to its neighboring pixels, considered as "normal". "Normal" behavior of a pixel means a pixel behavior close to that of the set of pixels of the retina or of the set of signal-forming chains, so that a "1-point" or "2-point" correction shows no deviating of the corrected signal originating from the pixel in standard operating conditions.

The following table lists known recurrent defects associated with bolometric retinas as well as the physical causes thereof. Notation CL (for continuous level) here refers to the value of the raw signal originating from a pixel when the retina is exposed to a substantially temperature-uniform scene.

| Physical cause of the defect | Effect/Defect observed on the CL pixel |
|---|---|
| Shorted pixel | CL at the dynamic range limit |
| Open-circuit pixel | CL at the dynamic range limit |
| Abnormal deviating of the responsiveness of the pixel signal-forming chain | Abnormal CL deviating for a strong incident flow |
| Abnormal deviating of the bolometer resistance | Abnormal CL deviating whatever the incident flow |
| Abnormal noise deviating | Fluctuating CL for a constant flow |
| Pixel coming after (in read mode) a pixel which is shorted or in open circuit. This pixel is located on the same row or on the same column to within a few indexes (i, j) and has its signal processing chain temporally affected by an abnormal state of the previous signal. | Fluctuating CL whatever the incident flow and abnormal CL deviating whatever the incident flow |
| Electronic defect on the pixel signal-forming chain (for example, defect of the bias transistor or of the CTIA) | Fluctuating CL whatever the incident flow and CL deviating independent from the flow or from the bolometer |

To know the existence of possible defective pixels, operability tests are usually carried out in factory, that is, before the detector is put into service, by performing various measurements and analyses aiming at establishing the compliance of the measurements of each of the pixels with respect to a predetermined functional compliance window. The concerned measurements generally comprise extracting, at the level of each of the pixels, especially the following functional parameters:

continuous level CL;

responsiveness Resp, that is, the signal variation originating from the pixel with respect to a uniform variation of the uniform scene to which the retina is exposed; and the temporal noise of the signal originating from the pixel.

Operability tests thus enable to establish a list of defective pixels, or "operability table", that is, a series of row and column coordinates defining the location of said pixels in the pixel array. The operability table is then stored in unit 42 and exploited by said unit on use of the detector to correct the points of the images corresponding to the defective pixels, for example, the replacing of the signal of these pixels by an average of the signals provided by the neighboring pixels.

However, an operability table is the image of the detector defects at a specific time only, and for specific environmental conditions, particularly of temperature and illumination, and for specific operating conditions, particularly biasing conditions. First, a pixel may be defective for the specific environmental and operating conditions implemented for the operability test and be however considered non defective for other environmental and operating conditions. Thus, a modification of the environmental and operating conditions is capable of inducing on certain pixels initially considered compliant, modifications of their output signal considered as non-compliant in the new environmental and operating conditions, thereby making the operability table irrelevant for these pixels. To overcome such a problem, operability tables should thus be determined for multiple environmental and operating conditions. In addition to the cost and the duration necessary to obtain a multiplicity of tables, it is not possible to reproduce during initial factory operability tests all the conditions that a detector can encounter during its use, so that the issue of the validity of embarked tables regarding the conditions encountered by the detector would arise even so.

Further, for specific environmental and operating conditions, the behavior of certain pixel may unexpectedly substantially drift, and certain pixels may even totally lose their functionality. The operability table may thus prove being irrelevant once the detector is in service. The operability table should thus be regularly updated to take this phenomenon into account. Now, the above-described measurements usually require using complex and expensive optical devices, particularly using reference "black bodies" for different temperatures. Similarly, the bolometer resistance is not directly measurable from the output signals of the signal-forming chains due to the fact that a compensation is generally provided to reject the common mode in the forming of these signals to only measure small signal variations due to the resistance variations induced by the incident flow of the observed scene.

The determination of the bolometer resistances thus requires specific procedure and equipment. Since only the constructor generally has this type of equipment, the updating of the operability table accordingly requires returning the detector to the factory to implement a new operability test.

SUMMARY OF THE INVENTION

The present invention aims at providing a method of diagnosing the defective state of a detector comprising a bolometric retina, only based on the signals downstream of the detector read circuit, and thus without requiring using specific equipment, and thus enabling to implement the diagnosis even when the detector is in service.

For this purpose, an object of the invention is a method of diagnosing the defective state of signal-forming chains of a bolometric detector, called "chain" hereafter, comprising a array of detection bolometers suspended above a substrate, each chain comprising a bolometer of said array, a circuit of electric stimulation of said chain, and a circuit for forming a signal according to the stimulation applied to said chain by the stimulation circuit, said method comprising:

a. forming the image of a substantially uniform scene on the array of bolometers;

b. applying at least a different first stimulation and second stimulation to the chains;

c. reading the signals formed by the chains respectively corresponding to the applied stimulations; and d. for each chain of a predetermined set of chains to be diagnosed:

defining a neighborhood formed of chains having neighboring detection bolometers in the detection bolometer array of said chain;

calculating coefficients of a polynomial interpolating the values of the signals formed by said chain according to said at least first and second applied stimulations;

calculating, for each chain of the neighborhood of said chain, coefficients of a polynomial interpolating the values of the signals formed by the neighborhood chain according to said at least first and second applied stimulations;

calculating an average and a standard deviation of said calculated coefficients of the neighborhood chains or of the set formed of the neighborhood chains and of said chain; and diagnosing that said chain is defective if the value of said coefficients thereof is outside of margins defined according to the calculated average and standard deviation.

The diagnosis is thus performed by deciding of the compliance or the non-compliance of any signal originating from a bolometer of the array in relation with its belonging to an interval established from signals originating from neighboring bolometers. "Signal-forming chain" or "chain" means the circuits and the components contributing to forming a signal originating from a detection bolometer.

Particularly, the signal-forming chain designates the circuits and the components contributing to forming a raw signal. In the example of the detector previously described in relation with FIGS. 1 and 2, the signal-forming chain associated with a bolometer 16 thus comprises the circuit of FIG. 2 but not the raw signal correction circuits.

As a variation, the signal-forming chain designates the circuits and the components contributing to forming a corrected signal if the compliance of this signal is desired to be known. In the example of the detector previously described in relation with FIGS. 1 and 2, the signal-forming chain associated with a bolometer 16 then comprises the circuit of FIG. 2, and thus particularly comprises pixel 14 comprising bolometer 16 as well as the circuits for correcting raw signal Vout originating from bolometer 16.

In the context of the compliance diagnosis according to the invention, term "stimulation" should be understood in a wide sense and designates all the parameters controlling the forming of the signals originating from each bolometer. Particular, this term designates the conventional electrical biasing applied on reading from the bolometer array, for example, a bias voltage or current, but also other parameters which contribute to forming the signal such as the integration duration and the frame frequency, for example. Further, it will be spoken of "chain stimulation" for the biasing both of the detection bolometers and of the compensation bolometers, and of "reading from the bolometer array" for the forming of the signals submitted to the tests corresponding to the chain "stimulation".

Thus, by varying the forming conditions of the signal delivered by a chain and by analyzing the induced variations of the signal by means of a polynomial interpolation, the defective state of the chain can be diagnosed with a low error rate. Particularly, the method according to the invention enables to diagnose defects induced by a non-conformal deviating of a detection bolometer resistance or of the responsiveness associated with a detection bolometer. Further, this method uses internal programmable elements usually embarked in the detector, so that it is not necessarily needed to modify the hardware of the circuits and processing units usually provided in state of the art detectors. Particularly, it is possible to only envisage a software modification of said circuits and units.

According to an embodiment of the invention, the chain stimulation is performed row by row of the bolometer array according to a frame frequency, and the at least first and second stimulations only differ by the applied frame frequency.

The frame frequency corresponds to the number of images delivered at the detector output per second. In other words, the frame frequency sets the recurrence rate of the current injection into the bolometers, and thus enables to vary their electric resistance by means of a self-heating thereof by Joule effect, without it being necessary to modify the characteristics of the bolometer bias voltage or current or the duration of application of this voltage or of this current. It is thus not necessary to modify the signal-forming chains, for example by providing variable voltage or current sources or by sizing the capacity of integrators to take into account the variability of the bias voltage or current or the integration duration.

According to an embodiment of the invention, the chain stimulation comprises applying a bias voltage to the bolometers, and the at least one first and second stimulations only differ by the bias voltage applied to the bolometers.

According to an embodiment of the invention, the chain stimulation comprises applying a bias current to the bolometers, and the at least one first and second stimulations only differ by the applied bias current.

According to an embodiment of the invention, the chain stimulation comprises applying a bias voltage and/or current to the bolometers for a biasing duration, and the at least one first and second stimulations only differ by the applied biasing duration.

According to an embodiment of the invention, steps a), b), c), and d) are carried out a plurality of times, each chain diagnosed as defective is recorded in a set of defective chains, and the neighborhood of a chain to be diagnosed comprises signal-forming chains:
  having their bolometers belonging to a bolometer window centered on the bolometer of the chain to be diagnosed; and
  which do not belong to the set of defective chains.

This enables not to include defective pixels capable of distorting the analysis due to the non-compliance of their signals in the calculation of the different parameters.

According to an embodiment of the invention, the average and the standard deviation used to assess the compliance of a chain are calculated from the polynomial coefficients extracted from the chain to be diagnosed and the polynomial coefficients extracted from the chains of the neighborhood thereof. If the chain is diagnosed as defective, the diagnosis is validated or invalidated:
  by calculating an average and a standard deviation of the interpolation polynomial coefficients of the chains of the neighborhood of said chain only; and
  by confirming the diagnosis if the value of the coefficients of the interpolation polynomial of said chain is outside of margins defined according to the average and to the standard deviation calculated according to the neighborhood only, and by otherwise invalidating the diagnosis.

In other words, the diagnosis is validated or invalidated by removing from the average calculation the parameters of the bolometer initially considered as defective, which enables to improve the robustness of the diagnosis.

BRIEF DESCRIPTION OF THE DRAWINGS

The present invention will be better understood on reading of the following description provided as an example only in relation with the accompanying drawings, where the same reference numerals designate the same or similar elements, among which:

FIG. 4 is a timing diagram of a method according to the invention implemented by the detector of FIG. 3; and FIG. 5 is a timing diagram detailing a defect detection algorithm implemented by the method of FIG. 3.

DETAILED DESCRIPTION OF THE INVENTION

Figure 1:
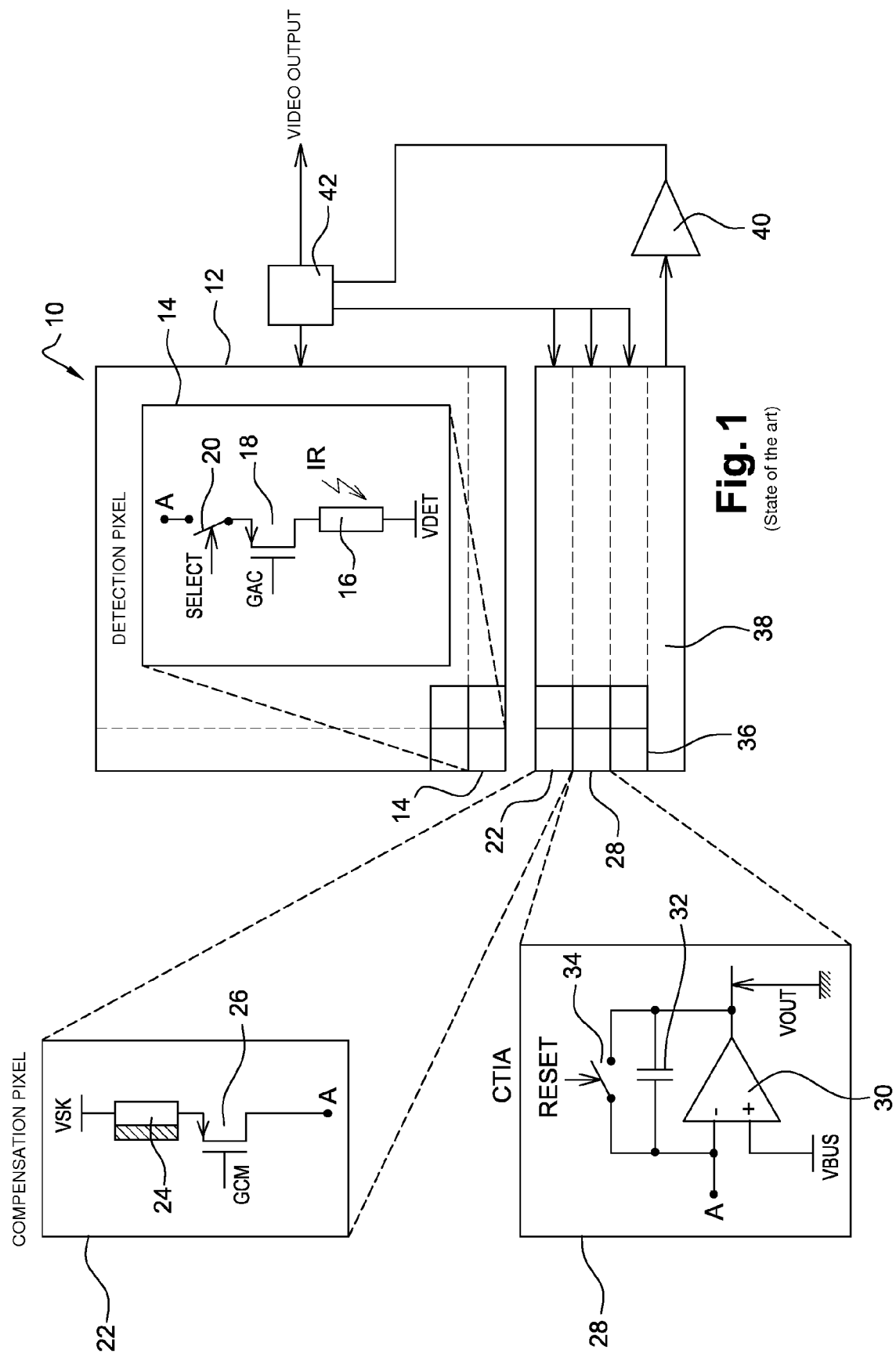
FIG. 1 is an electric diagram of an infrared bolometric detector of the state of the art, already described hereabove.

A detector 50 according to the invention implementing a diagnosis of the raw signal-forming chains will now be described in relation with FIG. 3. Detector 50 comprises a pixel array 10, compensation structures 22, integrators 28, sample-and-hold devices 36, a multiplexer 38, and an amplifier 40, such as previously described in relation with FIGS. 1 and 2.

In the following, the signals, the signal-forming chains and the operability table are referenced with respect to the position of detection bolometers 16 in bolometer array 12. Particularly, a raw image used for the operability test according to the invention is a "CL" array having dimensions equal to those of bolometer array 12, component CL(i,j) of coordinates (i,j) of the image being a signal associated with the detection bolometer of coordinates (i,j) in bolometer array 12. Similarly, operability table Top appears in the form of an array having dimensions equal to those of array 12, component Top(i,j) of coordinates (i,j) of table Top describing the conformal or defective state of the forming chain associated with the detection bolometer of coordinates (i,j) in bolometer array 12. Similarly, the signal-forming chains are referred to as C(i,j). It will be spoken of "neighboring" chains when their respective detection bolometers are neighbors in array 12.

Detector 50 also comprises a data control and processing unit 52, for example, one or a plurality of microprocessors associated with RAMs, ROMs, and mass storage memories, as known per se. Unit 52 particularly comprises a video processor 54, a control processor 56, a RAM 58, and a ROM and/or a mass storage memory 60.

Video processor 54 uses a synchronization block 62 controlling the different switches and bias circuits of the detector for the reading, for example, row by row, of bolometer array 12, as previously described. Video processor 54 also uses a correction block 64 receiving the signals generated by the reading of array 12, for example, signals generated by an analog-to-digital converter 66 connected to output amplifier 40. Block 64 applies a "1-point"- or "2-point"-type correction to the received signals according to offset and gain tables loaded into an area 65 of RAM 58 from memory 60 on powering-on of the detector and regularly updated as known per se. The corrected images thus obtained undergo an additional correction taking into account the defective state of certain chains, as described hereafter, and are then delivered on a video output 68.

Control processor 56 comprises a block 70 implementing a detection of defective signal-forming chains of detector 50, or "operability test", as well as a block 72 calculating signals for replacing the signals originating from the chains detected as being defective by block 70.

Detection block 70 is connected to one or a plurality of elements and circuits involved in the forming of the electric signals applied to detection and compensation bolometers 16 and 24 to generate output voltages Vout according to a plurality of predetermined stimulations, each stimulation being defined by a set of parameters loaded into an area 74 of the RAM from memory 60 when the detector is powered on. Particularly, detection block 70 is connected to synchronization block 62 to deliver thereto signals for controlling the switches and the bias circuits of detector 10 to control integration time Tint by CTIAs 28 and/or frame frequency fframe on reading from array 12.

As a variation, or additionally, block 70 is connected to a circuit 76 for controlling the bias voltages of detection and compensation bolometers 16 and 24 to deliver to circuit 76 bias voltage set points, particularly voltages set points GAC and GCM of bias transistors 18 and 26. A controllable voltage source may also be provided in the detector to generate controllable voltages VDET and VSK, this voltage source being driven by block 70 to vary the bias voltages across detection and compensation bolometers 16 and 24.

Block 70 is also connected to the output of analog-to-digital converter 66 and thus receives the raw digital signals and stores them in a buffer area 78 of RAM 58.

Finally, block 70 implements an algorithm of detection of the defective signal-forming chains according to the different simulations applied for the operability test, as will be described in further detail hereafter. Particularly, block 70 identifies the defective chains and lists them in an operability table Top stored in an area 80 of the RAM and in memory 60.

Replacement signal calculation block 72 is connected to RAM 58 to access operability table Top 80 and block 64 to receive the corrected images therefrom. For each calculated corrected image delivered by block 64, block 72 replaces component (i,j) of the associated corrected image originating from a chain C(i,j) recorded as defective in table Top with another value, for example, the average of the corrected components of the image originating from neighboring chains.

A method of defective signal forming chain detection implemented by the detector just described will now be described in relation with the flowchart of FIGS. 4 and 5.

Referring to FIG. 4, the method starts, at 100, with a first operability test carried out in factory, for example, a operability test such as carried out in the state of the art, to determine an initial operability table $T_{op}$ listing the defective signal forming chains. Initial operability table $T_{op}$ is then stored in memory 60 of the detector and is used to correct the signals originating from chains considered as defective listed therein. Step 100 is however optional, since an operability table can be established for the first time when the detector is in service by means of the steps described hereafter.

At a step 102, a plurality of stimulations are stored in memory 60 of the detector. Particularly, at least a set of at least two stimulations varying from each other by a defined minimum value of a single parameter are stored in memory 60, for example, this stimulation may refer to the bias voltage, the integration duration, or the frame frequency of the reading from array 12. A plurality of stimulation sets may be stored, each characterized by the variation of a single stimulation parameter, each set comprising at least two stimulations, and advantageously three stimulations, as will be explained in further detail hereafter.

Preferably, the variable parameter of a same stimulation set is selected to be sufficiently different from one stimulation to the other to imply the production of sufficiently different signals to obtain a robust analysis of their variation, as will be explained in further detail hereafter. Preferably, the at least two parameter values per stimulation set are selected to obtain a substantially regular distribution of the signals, with a maximum excursion inscribed within the electrical output dynamic range. For example, when the number of stimulations of a specific set is equal to two, the two values of the parameter characterizing this set are selected to obtain a maximum distance between resulting signals, while ensuring that the signals are within the read dynamic range. When the number of stimulations of a stimulation set, and thus the number of different values of the parameter characterizing this set, is equal to three, these three values are selected to obtain an identical or approximately identical interval between the resulting signals and a maximum interval between the smallest signal and the largest signal, while ensuring that the signals are within the read dynamic range.

Figure 2:
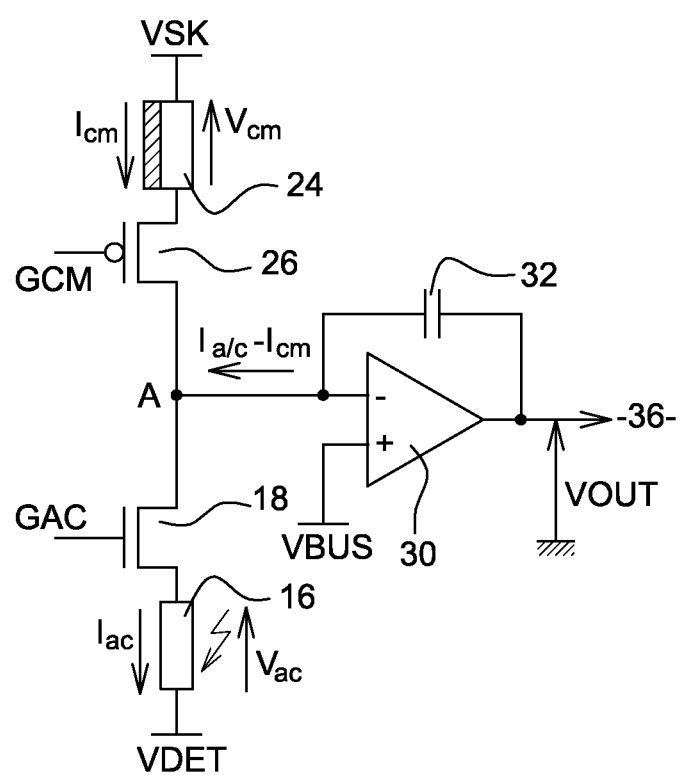
FIG. 2 is an electric diagram illustrating the reading from a detection bolometer of the detector of FIG. 1 by means of a compensation structure.
Figure 3:
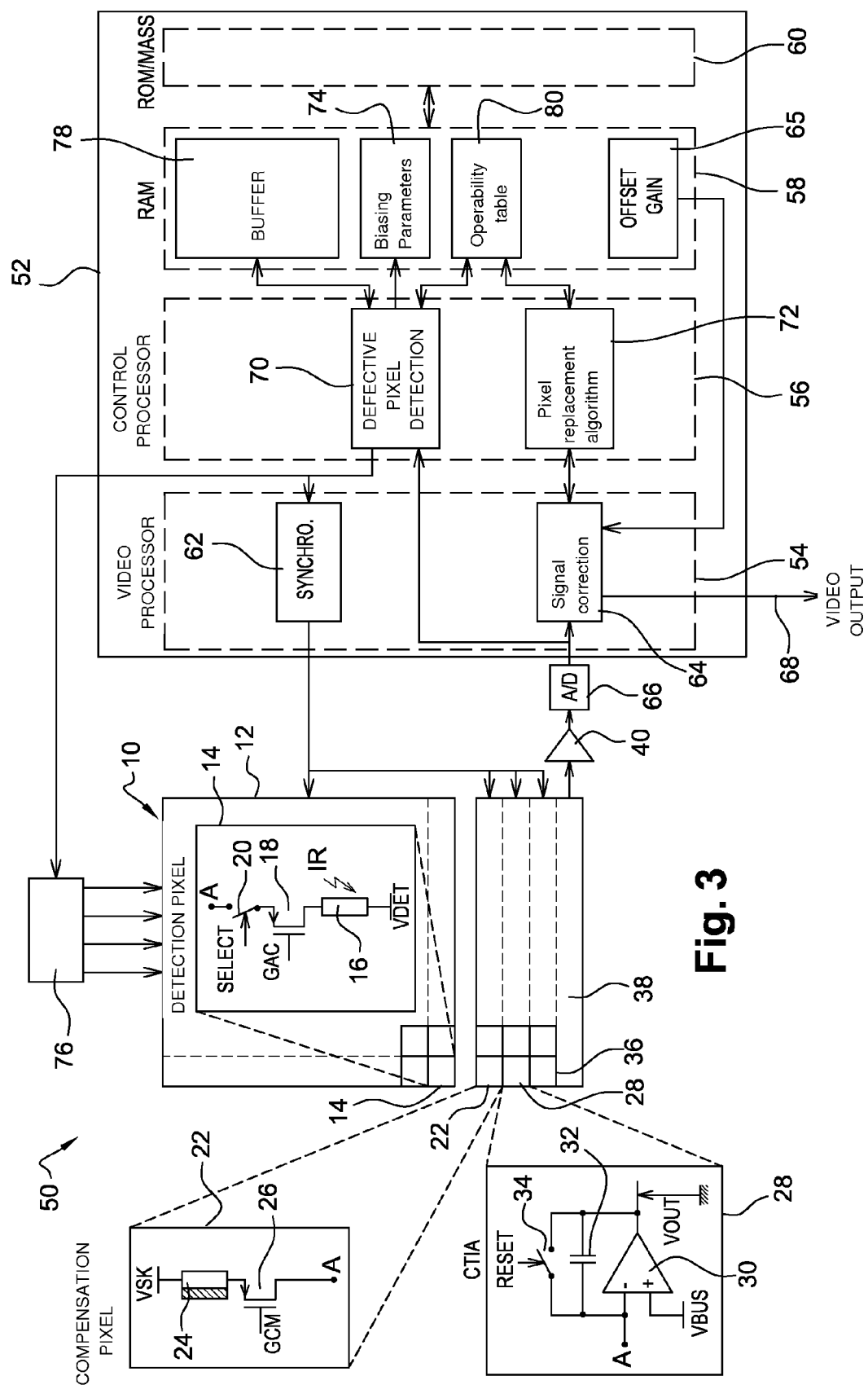
FIG. 3 is an electric diagram of an infrared bolometric detector according to the invention.

The stimulation parameters particularly comprise, for the detector of FIGS. 1 and 2:

- the values of control voltages GAC and GCM of bias transistors 18, 26 setting the voltage at one of the terminals of detection and compensation bolometers 16 and 24; and/or
- the values of voltages VDET and VSK setting the voltage at the other terminal of detection and compensation bolometers 16 and 24;
- time Tint of integration of the difference between the currents flowing in detection bolometers 16 and the currents flowing in compensation bolometers 24 by integrators 28; and/or
- the read frequency of the rows of array 12, that is, the frame frequency.

In parallel, different operating parameters useful to the implementation of the operability test according to the invention are also stored in memory 60, particularly parameters used for a test for triggering the update of the operability table, parameters used for the detection algorithm, etc.

Once the detector has been put into service, at 104, a process of update of operability table Top is then triggered. More specifically, the process comprises a test 106 for deciding whether conditions for updating said table are fulfilled before implementing detection block 70. For example, an update is regularly implemented, particularly each time the detector is powered on, periodically, or on request by the user. Further, as known per se, the "1-point" or "2-point" correction usually also requires an update of one or a plurality of offset tables, such an update comprising acquiring a uniform scene. The method of updating operability table Top also using such an acquisition, as described hereafter, the update of operability table Top is advantageously implemented jointly with the update of the tables of the "1-point" or "2-point" correction implemented by the detector, so that the acquired uniform scenes can be shared by the two update processes.

If an update condition is fulfilled, the method then carries on, at 108, with the forming of a substantially uniform scene for array 12 of detection bolometers 16. For example, when detector 10 is equipped with a mechanical shutter, placed between the optical system and the focal plane thereof having array 12 arranged therein, this shutter is driven by detection block 70 which controls its closing. The uniform scene is thus formed of the shutter surface facing array 12. As a variation, particularly when the detector comprises no shutter, the optical system of the detector can be defocused and/or the user places the detector in front of a uniform scene, for example, a thermally-uniform grey background, or a scene naturally having a very low contrast, such as for example a clear sky or, on the contrary, a very cloudy sky.

Once array 12 of bolometers 16 has been submitted to the substantially uniform scene, the method carries on with the application of the stimulation set(s) to array 12 according to the stimulation parameters stored in area 74, and at least a raw image of the uniform scene is acquired for each applied stimulation. Particularly, at 110, a set of stimulations is selected and a stimulation in this set, defined by a stored set of parameters, is selected from memory 74. Still at 110, the selected set of parameters may be modified as described hereafter, and the stimulation corresponding to the set of parameters, possibly modified, is applied. At 112, array 12 is read to acquire at least one raw image for the applied stimulation. A test is then implemented at 120 to know whether all the sets of parameters for all assemblies have been applied. If not, the method then loops back onto step 108 to select a new set of parameters, and to correspondingly apply a new stimulation to array 12.

The number of different stimulations applied to array 12 depends on the type of analysis implemented on the resulting signals. Advantageously, for each stimulation set, three different stimulations involving the variation of one and the same stimulation parameter are applied to array 12 to subsequently implement a second-order polynomial interpolation, as will be described in further detail hereafter.

Particularly, at step 110, detection block 70 controls, at 114, the stimulation of array 12 by applying the set of selected parameters, and at least one corresponding raw image of the uniform scene is acquired and stored in area 78 of memory 58.

Detection block 70 then implements, at 116, an analysis of the acquired raw image(s) to known the statistic saturation state of the raw signals forming these images. An inadequate stimulation of array 12 may indeed cause the saturation of a non-negligible number of signals if this stimulation is not adapted to the current environmental conditions in front of the uniform scene, without for the saturation to be imputable to a defect in the signal-forming chains. For example, the applied bias voltage might saturate the signal if the uniform scene has too high a temperature with respect to the bolometer temperature. Particularly, detection block 70 tests, at 116, whether the saturated signals in the raw image just acquired can be imputed to their positioning in the natural statistics of the array rather than to a defective chain. Advantageously, an analysis of the histogram of the raw values is performed to know whether the acquired image is underexposed or overexposed, and accordingly to know whether the number of saturated raw values can be mainly imputed, rather than to defective chains, to an applied stimulation which does not allow a proper exposure of the resulting image.

If the test result at 116 is negative, this means that the acquired raw image is not satisfactory due to the applied set of parameters, block 70 then implements, at 118, a modification of the selected set of parameters, in order to decrease the number of saturated signals, and the method loops back onto test step 114 to apply the modified set of parameters and to know whether this modified set effectively achieves this aim.

Advantageously, block 70 modifies the initial stimulation, that is, the initial value of the parameter characterizing the selected set being tested, to obtain a centering of the average of the output signals in the output electrical dynamic range. For example, block 70 adjusts said parameter so that each of output signals $CL(i,j)$ comprised within interval $[M-s \cdot SD, M+s \cdot SD]$ is distant by a predetermined margin, for example, 0.2 V, from high and low saturation limits CLmax and CLmin. In this relation, M and SD respectively are the average and the standard deviation of the output signals, and s is a positive real number, for example, equal to 3. For example, the bias voltage and/or the integration time may be adjusted to draw away the signals from the high and low limits of the dynamic range.

Particularly, for each stimulation parameter P, the monotony of the output signal according to this parameter is known. Thus, the detection of a saturation for a given parameter value according to the test on the belonging to interval $[M-s \cdot SD, M+s \cdot SD]$ enables to modify this last value to find a rest point functional in the desired sense. Such a modification may be implemented by known methods. For example, parameter P used for the test may be replaced with value $P+/-p$, where the sign depends on the monotony of the signal according to the parameter and to the observed saturation type (high or low), and p is a predetermined analog increment or "pitch". The new parameter is then applied and the resulting signal is analyzed. If the resulting population CL(i,j) is still not acceptable, the incrementation is resumed until an acceptable operating point is found. A logarithmic incrementation or decrementation process is also applicable to limit the convergence time.

If the result of test 116 is positive, that is, if the value of the parameter being applied, possibly modified, is considered satisfactory in terms of statistic saturation of the signals, the method carries on with the storage of the corresponding raw images at 112.

Once it has been considered, at 120, that all the stimulations necessary to implement the diagnosis have been applied, and the corresponding raw images are stored, the method carries on at 122 with the normal restarting of the detection, the shutter, if present, being open, and loops back onto test step 106 to decide whether the conditions for updating operability table Top 80 are fulfilled again.

In parallel, or consecutively, the method carries on, at 124, with the implementation by block 78, of an algorithm of detection of defective signal-forming chains according to the stimulations applied for the operability test and the corresponding stored images, and with the update, at 126, of operability table Top 80.

Referring to the flowchart of FIG. 5, step 124 comprises, for each applied stimulation, a first step 128 of forming an average of the stored images corresponding to the stimulation. Step 128 is optional and implemented if a plurality of images have been acquired for each stimulation. Acquiring a plurality of images and forming their average enables to do away with signal fluctuations due to the noise intrinsic to the different chains and thus to refine for each chain the value of the coefficient of the polynomial which is extracted therefrom.

At a step 130, a polynomial interpolation is then implemented for each set of stimulations and for each chain C(i,j), advantageously only each chain not recorded as defective in operability table Top. More particularly, for a set of stimulations and for a chain C(i,j), block 70 calculates and stores in buffer area 58 coefficients of a polynomial of an order smaller than or equal to N−1, and preferably equal to N, where N is the number of stimulations in the set applied for the operability test, and interpolating the values of signals CL(i,j), associated with chain C(i,j) and stored in the corresponding acquired images, according to the values of the variable parameter of the set, that is, a polynomial fulfilling the following relation:

$$\begin{pmatrix} CL(i,j)(1) \\ CL(i,j)(2) \\ CL(i,j)(3) \\ \vdots \\ CL(i,j)(k) \\ \vdots \\ CL(i,j)(N) \end{pmatrix} = \qquad (1)$$

$$\begin{pmatrix} 1 & p(1) & p(1)^2 & \cdots & p(1)^m & \cdots & p(1)^{N-1} \\ 1 & p(2) & p(2)^2 & \cdots & p(2)^m & \cdots & p(2)^{N-1} \\ 1 & p(3) & p(3)^2 & \cdots & p(3)^m & \cdots & p(3)^{N-1} \\ \vdots & \vdots & \vdots & \vdots & \vdots & \vdots & \vdots \\ 1 & p(k) & p(k)^2 & \cdots & p(k)^m & \cdots & p(k)^{N-1} \\ \vdots & \vdots & \vdots & \vdots & \vdots & \vdots & \vdots \\ 1 & p(N) & p(N)^2 & \cdots & p(N)^m & \cdots & p(N)^{N-1} \end{pmatrix} \begin{pmatrix} \alpha_0(i,j) \\ \alpha_1(i,j) \\ \alpha_2(i,j) \\ \vdots \\ \alpha_m(i,j) \\ \vdots \\ \alpha_{N-1}(i,j) \end{pmatrix}$$

in which expression:
- CL(i,j)(k), k∈[1,N] is the raw signal CL(i,j) associated with the $k^{th}$ applied stimulation and stored in a corresponding raw image CL(k);
- p(k), k∈[1, N] is the value of the variable parameter of the $k^{th}$ applied stimulation; and
- $\alpha_m$(i,j), m∈[0,N−1] is the coefficient of order m of the interpolation polynomial calculated for signal-forming chain C(i,j).

$\alpha_m$(i,j), m∈[0,N−1] is the coefficient of order m of the interpolation polynomial calculated for signal-forming chain C(i,j).

According to this advantageous variation, three stimulations are for example applied for each set to obtain an interpolation of order 2, relation 1 then coming down to the following relation:

$$CL(i,j)(1) = \alpha_0(i,j) + \alpha_1(i,j) \times p(1) + \alpha_2(i,j) \times p(1)^2$$

$$CL(i,j)(2) = \alpha_0(i,j) + \alpha_1(i,j) \times p(2) + \alpha_2(i,j) \times p(2)^2$$

$$CL(i,j)(3) = \alpha_0(i,j) + \alpha_1(i,j) \times p(3) + \alpha_2(i,j) \times p(3)^2 \qquad (2)$$

In the case of an interpolation of order 1, two stimulations are applied, relation (2) coming down to two equations only involving coefficients $\alpha_0$(i,j) and $\alpha_1$(i,j).

The coefficients of the polynomial are calculated in a way known per se.

At a next step 132, block 70 implements a spatial analysis of the coefficients calculated for each chain C(i,j) and for each set of stimulations to highlight the signal-forming chains generating a signal deviating from the signals generated by the neighboring chains. More particularly, for each detection bolometer (i,j) of chain C(i,j), block 70 first defines an area V(i,j) of array 12 comprising bolometer (i,j) and neighboring detection bolometers which do not belong to chains listed as defective in operability table Top, for example, a rectangular window comprising the bolometers of the non-defective chains of coordinates (u,v)∈[i−$u_1$,i+$u_2$]×[j−$v_1$,j+$v_2$], where $u_1$, $u_2$, $v_1$, $v_2$ are positive integers, for example $u_1$=$u_2$=4 and $v_1$=$v_2$=3.

Block 70 thus calculates an average Moy(i,j) and a standard deviation Sig(i,j) of coefficients $\alpha_m$(i,j) of chain C(i,j) on neighborhood V(i,j) according to relations:

$$Moy(i,j) = \frac{1}{Card(V(i,J))} \times \sum\sum_{(u,v)\in V(i,j)} \begin{pmatrix} \alpha_0(u,v) \\ \alpha_1(u,v) \\ \alpha_2(u,v) \\ \vdots \\ \alpha_m(u,v) \\ \vdots \\ \alpha_{N-1}(u,v) \end{pmatrix} \qquad (3)$$

-continued $$Sig(i,j) = \sqrt{\frac{1}{\text{Card}(V(i,j))} \times \sum\sum_{(u,v)\in V(i,j)} \left(\begin{pmatrix} \alpha_0(u,v) \\ \alpha_1(u,v) \\ \alpha_2(u,v) \\ \vdots \\ \alpha_m(u,v) \\ \vdots \\ \alpha_{N-1}(u,v) \end{pmatrix} - Moy(i,j)\right)^2} \quad (4)$$

where Card $(V(i,j))$ is the number of bolometers in area $V(i,j)$. For example Card $(V(i,j))=(u_1+u_2)\times(v_1+v_2)$ when no detection bolometer of window $[i-u_1,i+u_2]\times[j-v_1,j+v_2]$ belongs to a signal-forming chain listed as defective in operability table Top At a next step 134, block 70 calculates for each chain $C(i,j)$ not listed as defective in operability table Top and for each stimulation set, upper and low compliance margins $MC_{sup}(i,j)$ and $MC_{inf}(i,j)$ according to relations:

$$MC_{sup}(i,j) = Moy(i,j) + S \times Sig(i,j) \quad (5)$$

$$MC_{inf}(i,j) = Moy(i,j) - S \times Sig(i,j) \quad (6)$$

where S is a predetermined positive number

Block 70 then tests, at 136, for each chain $C(i,j)$ not listed as defective in operability table Top and for each assembly of sets of biasing parameters, whether or not the coefficients of the interpolated polynomial of chain $C(i,j)$ are within compliance margins $MC_{sup}(i,j)$ and $MC_{inf}(i,j)$, that is, whether or not the following relation is verified:

$$MC_{inf}(i,j) \le \begin{pmatrix} \alpha_0(i,j) \\ \alpha_1(i,j) \\ \alpha_2(i,j) \\ \vdots \\ \alpha_m(i,j) \\ \vdots \\ \alpha_{N-1}(i,j) \end{pmatrix} \le MC_{sup}(i,j) \quad (7)$$

If this is not the case for at least one stimulation set, chain $C(i,j)$ is then referenced as defective in operability table Top, which is accordingly updated at step 126.

The scene observed during the operability test being uniform, it can be observed that the coefficient of order $\alpha_0(i,j)$ corresponds to the offset of signal $CL(i,j)$ generated by chain $C(i,j)$, and that the coefficients of order m $\alpha_m(i,j)$ respectively correspond to the partial and local derivatives of order m of the offset with respect to the stimulation parameter of signal $CL(i,j)$. These coefficients thus represent different sensitivity levels measuring the deviance of a chain with respect to its neighbors. The inventors have in particular observed that the contrasts which appear on the corrected images when the operating conditions of the detector vary depend on spatial variations of these coefficients. The latter thus relevantly sign the conformal or defective state of the signal-forming chains.

Advantageously, step 136 loops back onto step 132 for a new implementation of the spatial analysis of the compliance margin calculation and of the compliance analysis of the chains with respect to said margins. A chain considered as defective may indeed invalidate the detection algorithm, particularly by overestimating the value of standard deviation $Sig(i,j)$ by taking into account defective chains in the calculation of this value. The detection algorithm stops, for example, after two consecutive implementations of steps 132-136 or when no further chain is detected as being defective.

As a variation, the calculation of average $Moy(i,j)$ and of standard deviation $Sig(i,j)$ is performed on area $V(i,j)$ without taking into account the polynomial coefficients of chain $C(i,j)$.

An embodiment where the stimulations are adjusted to minimize the number of saturated signals and/or the dispersion of the signal population has been described. As a variation, the stimulations are not adjusted, but are directly applied with no modification.

An embodiment has been described where several stimulation sets are applied, which enables to increase the robustness of the detection, or diagnosis, of defective chains. As a variation, a single stimulation set is used. It can be observed that the detection remains robust, while accelerating the image acquisition for the operability test, and thus minimizing the detector deactivation time.

An embodiment where a plurality of images are acquired for each applied stimulation, which provides an essentially noiseless average image, has been described. As a variation, an estimate of the temporal noise is implemented by calculating the standard deviation of each signal $CL(i,j)$ of the images with respect to the average thereof, which enables to determine a defective behavior in terms of noise when signal $CL(i,j)$ deviates from its average by more than a determined margin according to the standard deviation.

As a variation, or additionally, a single image is acquired for each stimulation, and the operability test is implemented a plurality of times to determine a plurality of values for the coefficients of the interpolation polynomial(s). Having different values of these coefficients for several times, it is thus possible to determine whether the values thereof are tainted with noise and to determine that a signal-forming chain is defective in terms of noise.

An embodiment where raw signal-forming chains are diagnosed has been described. As a variation, if the corrected signal-forming chains are desired to be tested, block 70 is connected to the correction block of signals 64 to receive the corrected signals and store them in area 78, the method steps being further identical to those described previously.

What is claimed is:

1. A method of diagnosing the defective state of signal-forming chains of a bolometric detector comprising an array of detection bolometers suspended above a substrate, each chain comprising a bolometer of said array, a circuit of electric stimulation of said chain, and a circuit for forming a signal according to the stimulation applied to said chain by the stimulation circuit, said method comprising:
   a. forming an image of a substantially uniform scene on the array of bolometers;
   b. applying at least a different first and second stimulations to the chains;
   c. reading the signals formed by the chains corresponding to the applied stimulations; and
   d. for each chain of a predetermined set of chains to be diagnosed:
      defining a neighborhood formed of chains having detection bolometers which are neighbors to the detection bolometer of said chain;
      calculating coefficients of a polynomial interpolating the values of the signals formed by said chain according to said at least one first and second applied stimulations;

calculating for each chain of the neighborhood of said chain, coefficients of a polynomial interpolating the values of the signals formed by said neighborhood chain according to the at least one first and second applied stimulations;

calculating an average and a standard deviation of said calculated coefficients of the neighborhood chains or of the set formed of the neighborhood chains and of said chain; and diagnosing that said chain is defective if the value of said coefficients thereof is outside of margins defined according to the calculated average and standard deviation.

2. The method of claim 1, wherein the chain stimulation is performed row by row of the bolometer array according to a frame frequency, and wherein the at least one first and second stimulations only differ by the applied frame frequency.

3. The method of claim 1, wherein the chain stimulation comprises applying a bias voltage to the bolometers, and wherein the at least one first and second stimulations only differ by the applied bias voltage.

4. The method of claim 1, wherein the chain stimulation comprises applying a bias current to the bolometers, and wherein the at least one first and second stimulations only differ by the applied bias current.

5. The method of claim 1, wherein the chain stimulation comprises applying a bias voltage and/or current to the bolometers for a biasing duration, and the at least one first and second stimulations only differ by the applied biasing duration.

6. The method of claim 1, wherein steps a), b), c), and d) are carried out a plurality of times, wherein each signal-forming chain diagnosed as defective is listed in a set of defective chains, and wherein the neighborhood of a chain to be diagnosed comprises chains:

having their bolometers belonging to a bolometer window centered on the bolometer of the chain to be diagnosed; and which do not belong to the set of defective chains.

7. The method of claim 1, wherein the average and the standard deviation are calculated from the polynomial coefficients extracted from the chain to be diagnosed and the polynomial coefficients extracted from the chains of the neighborhood thereof and wherein, if the chain is diagnosed as defective, the diagnosis is validated or invalidated:

by calculating an average and a standard deviation of the interpolation polynomial coefficients only of the chains of the neighborhood of said chain; and by confirming the diagnosis if the value of the coefficients of the interpolation polynomial thereof is outside of margins defined according to the average and to the standard deviation calculated according to the neighborhood only, and by otherwise invalidating the diagnosis.

* * * * *